United States Patent [19]
Hill

[11] Patent Number: 5,708,411
[45] Date of Patent: Jan. 13, 1998

[54] TIRE MONITORING SYSTEM, DEVICE AND METHOD

[75] Inventor: Carl U. Hill, Longmont, Colo.

[73] Assignee: D H Products, LLC, Longmont, Colo.

[21] Appl. No.: 533,269

[22] Filed: Sep. 25, 1995

[51] Int. Cl.$^6$ .................................................. B60C 23/00
[52] U.S. Cl. .......................... 340/447; 340/539; 340/442; 340/614; 73/146.2; 200/61.72; 116/34 R
[58] Field of Search ............................ 340/447, 539, 340/825.69, 825.72, 442, 614; 73/146.2; 200/61.22; 116/34 R

[56] References Cited

U.S. PATENT DOCUMENTS

| | | | |
|---|---|---|---|
| 2,860,321 | 11/1958 | Strickland et al. | 340/447 |
| 3,944,971 | 3/1976 | Ramirez | 340/447 |
| 4,067,235 | 1/1978 | Markland et al. | 73/146.5 |
| 4,160,234 | 7/1979 | Karbo et al. | 340/447 |
| 4,286,258 | 8/1981 | Nagy | 340/447 |
| 4,311,985 | 1/1982 | Gee et al. | 340/447 |
| 4,334,215 | 6/1982 | Frazier et al. | 340/539 |
| 4,675,656 | 6/1987 | Narcissa | 340/539 |
| 4,717,905 | 1/1988 | Morrison, Jr. et al. | 340/447 |
| 4,978,941 | 12/1990 | Brown | 340/447 |
| 5,001,457 | 3/1991 | Wang | 340/447 |
| 5,025,244 | 6/1991 | Huang | 340/442 |
| 5,101,544 | 4/1992 | Bartscher et al. | 116/34 R |
| 5,109,213 | 4/1992 | Williams | 340/47 |

OTHER PUBLICATIONS

Official Gazette, Jan. 18, 1977, p. 1332, "4,004,270", Claxton et al.
Official Gazette, May 16, 1978, p. 1141, "4,090,172", Vesnic.
Official Gazette, Jan. 10, 1978, p. 482, "4,067,235", Markland et al.

Primary Examiner—Jeffery Hofsass
Assistant Examiner—Julie B. Lieu
Attorney, Agent, or Firm—Robert E. Harris

[57] ABSTRACT

A tire monitoring system, device and method are disclosed for detecting and indicating the presence of one or more predetermined abnormal conditions of tires on a vehicle. The system includes a plurality of monitoring devices (each of which is inserted in a different one of the vehicle tires to be monitored with the monitoring devices being unattached, and thus freely movable, when within the tire) and a receiver unit (mounted to be readily accessible, such as within the cab of the vehicle). Each monitoring device includes a sensor unit and an associated transmitter unit both of which are enclosed within a housing unit that is cushioned, as needed. Periodic output signals indicative of sensed abnormal tire conditions are transmitted from the transmitter units to the receiver unit that includes a reception distance controller and provides an indication of abnormal tire condition detection, responsive to receipt of output signals from the transmitter units within the maximum reception distance, with the indication, normally visually displayed by an indicator, being continuos as long as output signals are received from the transmitter units within a predetermined time interval between received output signals.

11 Claims, 5 Drawing Sheets

TIRE MONITORING SYSTEM, DEVICE AND METHOD

FIELD OF THE INVENTION

This invention relates to tire monitoring, and, more particularly, relates to monitoring of tires on a vehicle to sense the presence of abnormal tire conditions, such as low tire pressure and/or high tire temperature.

BACKGROUND OF THE INVENTION

It is now well known that vehicle tires (normally pneumatic tires) can, and should, be monitored to avoid unwanted damage due to the occurrence of abnormal tire conditions, two such conditions being, for example, low tire pressure and high tire temperature, and numerous devices have been suggested for monitoring of tires to detect abnormal tire conditions, and, particularly, for monitoring of tires to detect low (and/or high) tire pressure.

Numerous arrangements are suggested in the prior art for sensing of tire pressure (see, for example, U.S. Pat. Nos. 4,067,235 (Markland et al.) and 5,025,244 (Huang)), as are arrangements utilizing pressure sensors in conjunction with transmitter units one (or both) of which appears to be located outside the casing of the tires being monitored (see, for example, U.S. Pat. Nos. 2,860,321 (Strickland et al.), 4,090,172 (Vesnic), 4,717,905 (Morrison, Jr. et al), 5,001,457 (Wang), 5,101,754 (Bartscher et al.), and 5,109,213 (Williams)).

Tire pressure sensing arrangements are also known to include mechanical structures, such as, for example, a combination that includes a pressure sensitive element, such as a diaphragm, and some type of switching element to effect sensing of tire pressure and providing of an output indication with respect thereto (see, for example, U.S. Pat. Nos. 3,944,971 (Ramirez) and 5,109,213 (Williams), and such mechanical structures are also known to include sleeve/screw pressure responsive adjustment and/or disabling elements (see, for example, U.S. Pat. No. 4,286,253 (Nagy)).

In addition, a transmitter arrangement positioned within the casing of tires being monitored and transmitting a signal from each of the tires upon sensing of abnormal conditions therein is also known (see, for example, U.S. Pat. Nos. 4,160,234 (Karbo et al.) and 4,334,215 (Frazier et al.), as are transmitter arrangements positioned outside the casing of tires being monitored and transmitting a like signal upon sensing of an abnormal condition with respect to each monitored tire (see, for example, U.S. Pat. Nos. 4,286,253 (Nagy) and 4,978,941 (Brown)).

Various arrangements are also known for verifying the occurrence of detected low tire pressure (see, for example, U.S. Pat. Nos. 4,004,270 (Claxton et al.), 4,311,985 (Gee et al.) and 4,978,941 (Brown)), and an arrangement is also known for sensing of both pressure and temperature from within the casing of tires being monitored (see, for example, U.S. Pat. No. 4,334,215 (Frazier et al.)).

SUMMARY OF THE INVENTION

This invention provides a simple and inexpensive, yet effective and dependable, system, device and method for monitoring tires to detect predetermined abnormal tire conditions, such as low tire pressure and/or high tire temperature, and provide an indication thereof to allow timely correction of detected abnormal conditions. More particularly, when an abnormality is sensed with respect to a monitored vehicle tire condition, an output signal indicative thereof is transmitted to a remotely positioned receiver unit providing an indication of abnormal tire condition detection, with the receiver unit preferably including a reception distance controller having an adjustable distance calibrated control for establishing the maximum distance of receiver unit response.

A sensor unit and an associated transmitter unit are preferably enclosed, or encased, within a housing, cushioned as needed, to form a monitoring device, and a thus formed monitoring device is positioned inside the casing of each tire to be monitored with each device being unattached, and therefore freely movable, when within the tire casing.

The sensor unit within the tire casing serves as a monitor for the tire and senses a predetermined abnormal condition (or conditions), such as sensing of low tire pressure by a pressure sensing unit and/or sensing of high tire temperature by a temperature sensing unit, and provides an output indication to the associated transmitter unit upon sensing of an abnormal tire condition (or conditions).

The transmitter units transmit a signal (preferably a substantially like signal) to the receiver unit to thus allow a simple indication to the vehicle operator that a fault (i.e., an abnormal tire condition) has been detected with respect to at least one tire being monitored. The transmitted signal is preferably a pulsed output signal (the pulsed output signal having a frequency of about 3 MHz in a working embodiment of the invention), and the receiver unit, when powered, provides an indication of abnormal tire condition detection responsive to receipt of a pulsed output signal, within the maximum distance of receiver unit response, from any of the transmitter units, with the indication being continuous thereafter so long as additional pulsed output signals are later received by the receiver unit within a predetermined time interval between received pulsed output signals.

It is therefore an object of this invention to provide an improved system, device and method for tire monitoring.

It is another object of this invention to provide an improved system, device and method for tire monitoring that is simple and inexpensive, yet is dependable and effective.

It is still another object of this invention to provide an improved system, device and method for monitoring of tires to detect one or more abnormal tire conditions, such as low tire pressure and/or high tire temperature.

It is still another object of this invention to provide an improved system, device and method for tire monitoring that includes sensing of predetermined abnormal tire conditions, transmitting of output signals responsive to sensed abnormal signals, receiving the transmitted output signals, and indicating abnormal tire condition detection responsive to receipt of the transmitted output signals.

It is still another object of this invention to provide an improved system, device and method for monitoring of tires that includes transmitting output signals indicative of sensed abnormal tire conditions to a receiver unit from a plurality of transmitter units each of which is enclosed within a housing unit that is positioned within a different one of a plurality of tires being monitored.

It is still another object of this invention to provide an improved device for monitoring of a vehicle tire wherein a sensor unit and an associated transmitter unit are enclosed within a housing unit, cushioned as needed, to form a monitoring device positionable within the casing of the tire to be monitored so that the monitoring device is unattached within the casing and therefore is freely movable therein.

It is still another object of this invention to provide an improved system, device and method for tire monitoring wherein the receiver unit includes a reception distance controller for establishing the maximum distance of receiver unit response.

It is still another object of this invention to provide an improved system, device and method for tire monitoring wherein pulsed output signals indicative of a sensed abnormal tire condition (or conditions) are provided from transmitter units to a receiver unit and wherein an indication of abnormal tire condition detection is provided by the receiver unit upon receipt by the receiver unit of a first output signal with the indication being thereafter continuous so long as additional pulsed output signals are later received by the receiver unit within a predetermined time interval between received pulsed output signals.

With these and other objects in view, which will become apparent to one skilled in the art as the description proceeds, this invention resides in the novel construction, combination, arrangement of parts, and method as hereinafter described, and more particularly defined by the appended claims, it being understood that changes in the precise embodiments of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
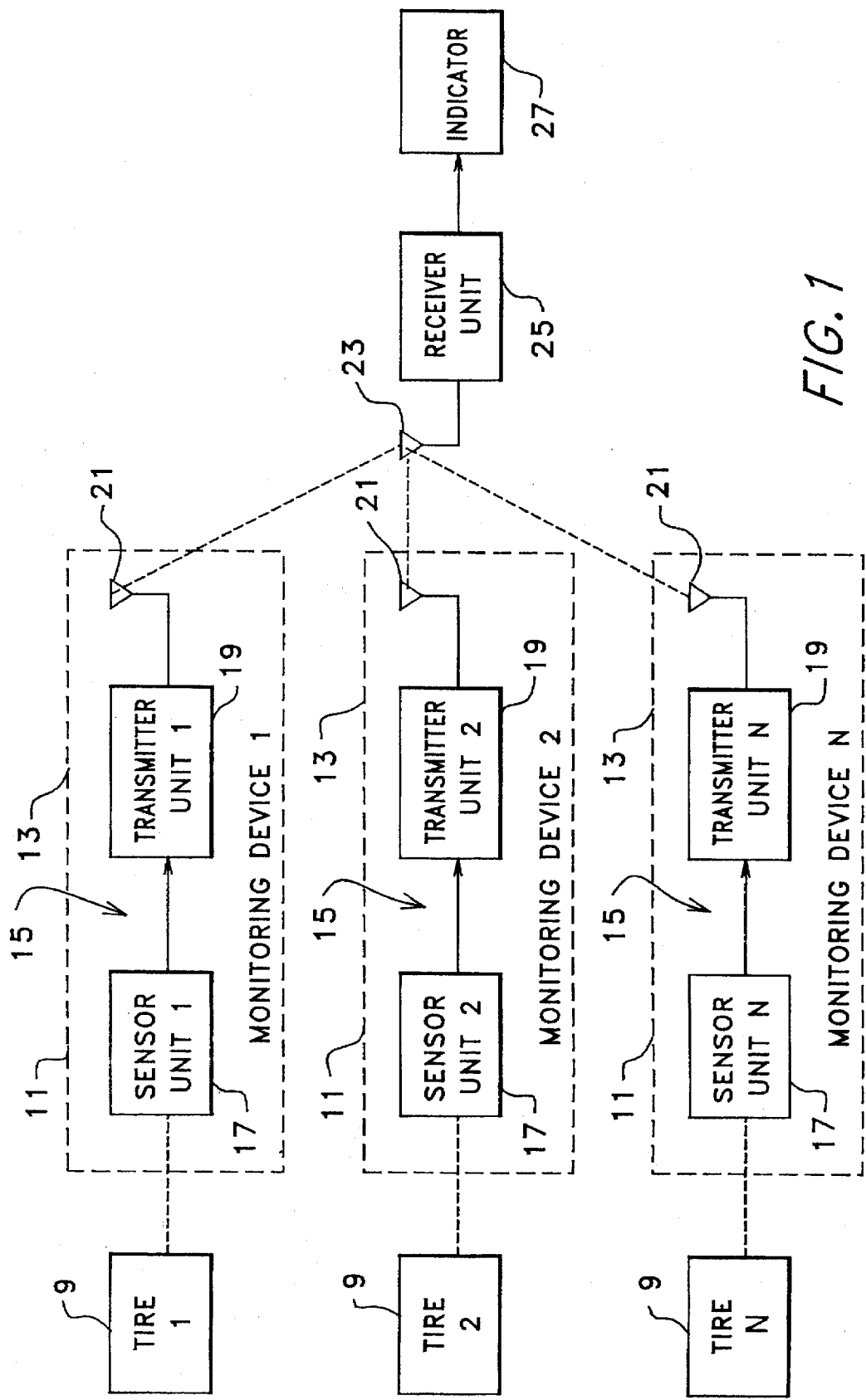
FIG. 1 is a simplified block diagram illustrating the system of this invention.

As indicated in FIG. 1, a plurality of tires 9 of a vehicle are individually monitored to detect the presence of one or more abnormal tire conditions, such as low tire pressure and/or high tire temperature (as particularly indicated in connection with FIGS. 2, 3A, 3B, 4A, 4B and 5 of the drawings).

A monitoring device 11 is used in connection with a different one of each of tires 9 and, as indicated in FIG. 1, each monitoring device 11 includes a housing unit, or enclosure, 13 having a sensor/transmitter unit 15 (unit 15 includes a sensor unit 17 and an associated transmitter unit 19 with transmitting antenna 21) enclosed, or encased, therein (and preferably encapsulated therein).

Output indications of abnormal tire conditions of monitored tires 9 are provided by each sensor unit 17 to its associated transmitter unit 19 and unit 19, responsive to receipt of an output indication from sensor unit 17, provides output signals that are transmitted from transmitting antenna 21 and received at receiving antenna 23 of receiver unit 25.

The output signals from all of the transmitting units 19 of the system are commonly received at receiver unit 25 and, responsive to receipt of an output signal from any of the transmitter units, receiver 25 provides an indication of abnormal tire condition detection, which indication is normally provided to indicator 27 (which may be a part of the receiver unit) where the indication is displayed, as by a visual display provided, for example, by energization of an electric bulb or the like (and/or by an audible indication provided by a beeper or the like).

Figure 2:
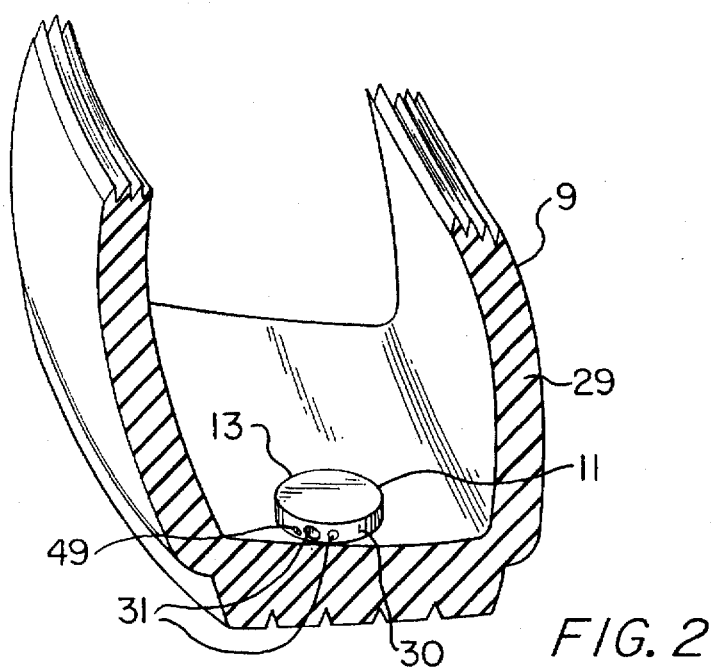
FIG. 2 is a prospective view of the monitoring device of this invention shown positioned within the casing (partially shown) of a tire to be monitored.

One monitoring device 11 is positioned within casing 29 of each tire 9 to be monitored, and, as indicated in FIG. 2, monitoring device 11 is preferably unattached, or unrestrained, within tire casing 29 and is therefore freely movable therein (with such movement being normally due to gravity forces when no movement of the tire is occurring and due to centrifugal forces when the tire is being rotated). Each monitoring device may be cushioned through use of cushioning material 30 on the external surfaces of housing unit 13, and, preferably, as shown in FIGS. 2, 3A and 3B, is fixed (as by use of a conventional adhesive) to the outer edge of cylindrically shaped housing unit 13 (although not shown, cushioning material could also be utilized within housing unit 13 as an addition to the cushioning at the external surfaces or as an alternative thereto).

Each monitoring device 11 is preferably relatively small and lightweight relative to the size and weight of tire 9, and in a working embodiment of the monitoring device, a housing size of about two and one-half inches (2 ½ in.) in circumference and about three-fourths inches (¾ in.) in depth and a weight of under about three ounces (3 oz.) was found to be effective.

Figure 3A:
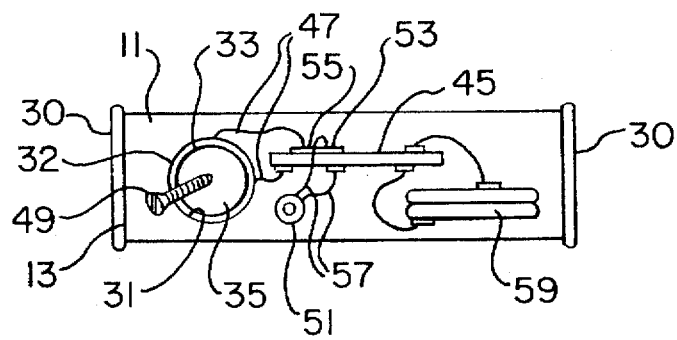
FIG. 3A is a cut-away side view of the monitoring device shown in FIG. 2.
Figure 3B:
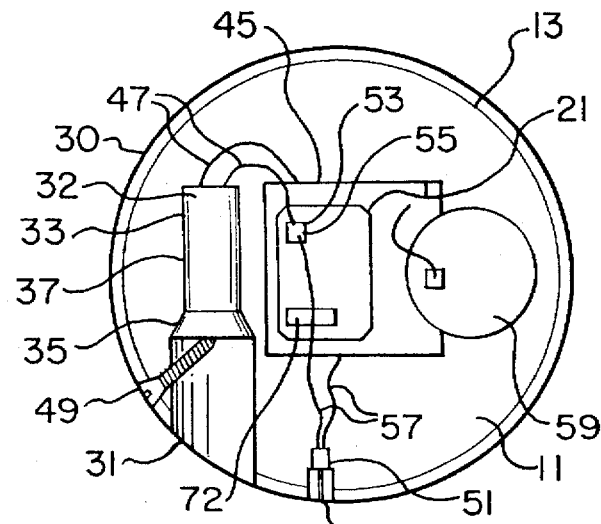
FIG. 3B is a cut-away top view of the monitoring device shown in FIG. 2.

As also indicated in FIGS. 2, 3A and 3B, housing, or housing unit, 13 of each monitoring device 11 has openings, or holes, 31 therein to enable a condition (or conditions) to be sensed by the sensor unit (or units) and to also enable sensor operation and/or settings to be effected as needed or desired. Although not shown, it is to be realized that a single opening 31 could be provided where only a single sensor unit is utilized and/or additional openings 31 could be provided, as needed or desired, to effect, for example, separate sensing of additional abnormal tire conditions and/or to provide separate access to the units within housing 13 to effect, for example needed setting variations.

Figure 5:
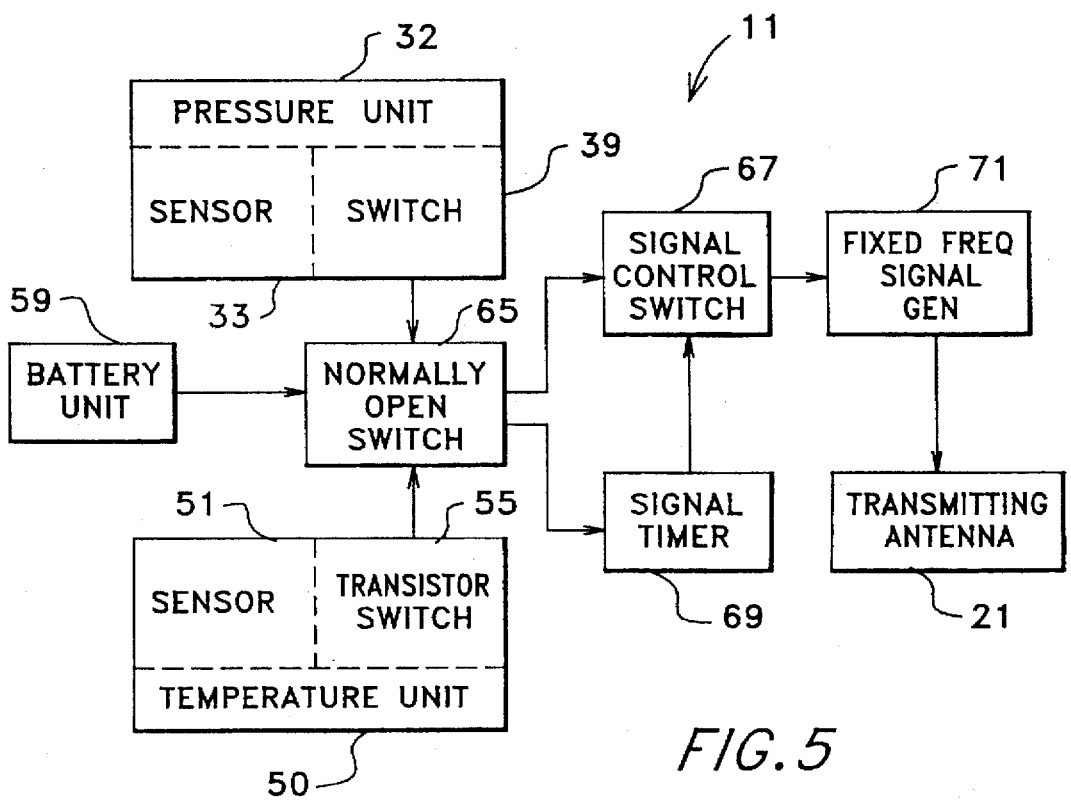
FIG. 5 a simplified block diagram of the monitoring device shown in FIG. 2 and including pressure and temperature sensor units.

As specifically indicated in FIGS. 3A, 3B and 5, when low tire pressure is an abnormal tire condition being sensed, sensor unit 17 includes pressure unit 32 having a pressure sensor 33 having a diaphragm 35 mounted on sensor housing 37 with one side of the diaphragm being exposed to air within casing 29 through opening 31 in housing unit 13 so that diaphragm 35 moves inwardly and outwardly responsive to the air pressure within casing 29 of the tire being monitored, as is well known.

Figure 4A:
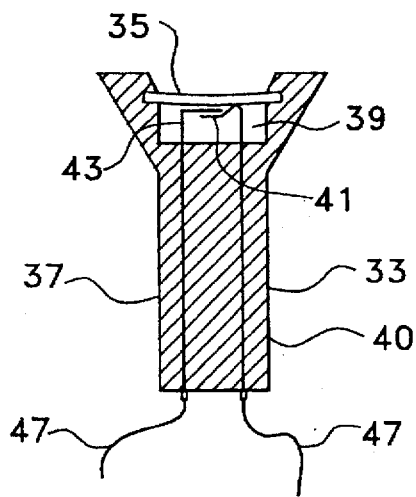
FIG. 4A is a cut-away side view of a pressure sensor used as a monitored condition sensor, and showing the pressure sensor in the open switch position.
Figure 4B:
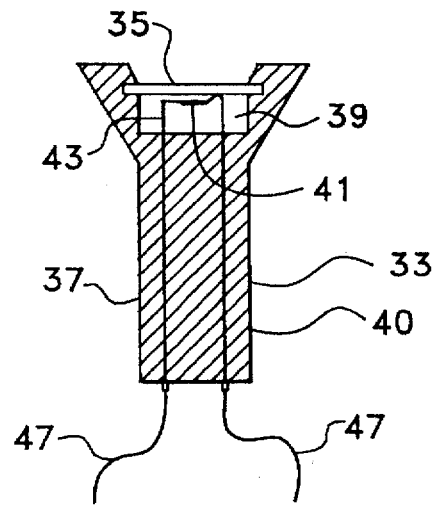
FIG. 4B is a cut-away side view like that of FIG. 4A but showing the pressure sensor in the closed switch position.

Normally open pressure switch 39 (a mechanical switch is indicated in FIGS. 4A, 4B and 5, but it is meant to be realized that a solid state, or transistor, pressure sensor switch could also be used) includes a body portion 40 mounted on (or a part of) sensor housing 37 so that movable contact 41 is in contact with (or is responsive to movement of diaphragm 35) and is moved from the open position spaced from fixed contact 43 (as best shown in FIG. 4A) toward the closed position upon movement of diaphragm 35 in response to a sensed decrease in tire pressure, with sufficient movement of the diaphragm causing the contacts 41–43 to be closed (as best shown in FIG. 4B). The amount of movement of the diaphragm responsive to incremental changes in sensed pressure and the setting of the length of movement necessary to effect switch closure (i.e., engagement of switch contacts 41 and 43), establishes a trigger sensing point corresponding to a predetermined desired low tire pressure at which an output indication of low tire pressure is provided by the pressure sensor (the low tire pressure can normally vary from about 85 psi down to about 20 psi depending upon the size of the tire to be monitored).

As indicated in FIGS. 3A and 3B, printed circuit board 45 is provided in monitoring device 11 and printed circuit board 45 has the necessary processing circuitry for both sensing unit 17 and transmitter unit 19 mounted thereon or adjacent thereto. As indicated, pressure switch 39 is connected with the circuitry of sensor unit 17 on board 45 through leads 47.

An operation disable screw, or control, 49 may also be provided at opening 31, as indicated in FIGS. 2, 3A and 3B, and screw 49 is preferably mounted on the sensor housing and extends through opening 31 to effectively disable, or prevent, operation of the pressure sensor by tightening of the screw so that the screw is in engagement with the diaphragm to prevent movement of the diaphragm in the direction causing closure of pressure switch 39.

As also indicated in FIGS. 2, 3A and 3B, when the tires of the vehicle are to be monitored to sense high tire temperature as an abnormal tire condition, sensor unit 17 includes temperature unit 50 having a temperature sensor 51, such as a thermistor, positioned at an opening 31 of housing unit 13 of the monitoring device, with thermistor 51 being connected with control circuitry 53, including a transistor switch 55, by leads 57 so that a temperature dependent output is provided to cause switch 55 to be closed at a predetermined output trigger point, or level, with the trigger point being chosen to correspond to a predetermined high temperature (at a temperature, for example of about 275° F.), as is well known.

Power for monitoring device 11 is internally provided by battery unit 59, as indicated in FIGS. 3A, 3B and 5. Sufficient power has been achieved through use of a pair of lithium batteries providing a six volt output over an extended period of time (the batteries are preferably able to withstand temperatures of between about −50° F. and 300° F. and have a shelf of about 5 years).

A simplified block diagram is set forth in FIG. 5 for typically illustrating the sensor/transmitter unit of each monitoring device 11 where both pressure and temperature sensor units are utilized. As shown, pressure unit 32 includes sensor 33 and switch 39, as brought out above, and temperature unit 50 includes sensor 51 and transistor switch 55, as brought out above. The switches of the sensor units control operation of normally open transistor switch 65 of transmitter unit 19 mounted on printed circuit board 45.

Upon closing of switch 65, battery unit 59 is connected with transmitter signal control switch 67 and signal timer 69. When signal timer 69 is energized, a timing signal is provided to signal control switch 67 to close the switch and allow power to be supplied to fixed frequency signal generator 71. Switches 65 and 67, signal timer 69 and/or fixed frequency signal generator 71 may be implemented by an integrated circuit, or circuits, 72 on printed circuit board 45, as indicated in FIGS. 3A and 3B. While energized, generator 71 generates a fixed frequency signal (alternately, a modulated RF signal could be generated, if needed or desired), and the output signal is transmitted from the transmitter unit by transmitting antenna 21 (the range of the transmitter units is up to about 110 feet).

Signal timer 69 repeatedly closes control switch 67 for short periods of time to provide a pulsed output signal from the transmitter unit (the pulsed output signal is transmitted for about five seconds in a working embodiment of this invention) and maintains control switch 67 closed between each pulsed output signal for a long period of time relative to the time duration of each pulsed output signal to thus preclude transmitting an output signal from the transmitter unit during this period (the time interval between pulsed output signals is about thirty seconds in a working embodiment of this invention).

Figure 6A:
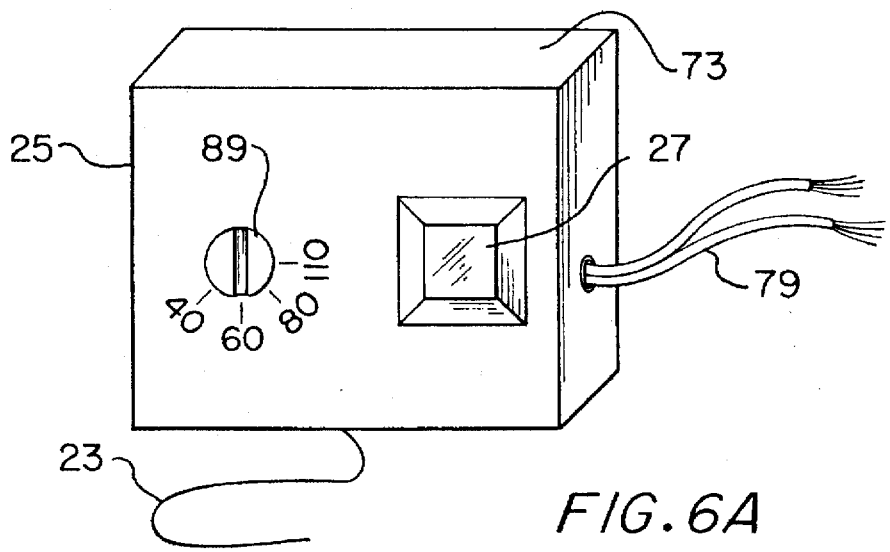
FIG. 6A is a perspective view of the receiver unit having an indicator mounted therein.
Figure 6B:
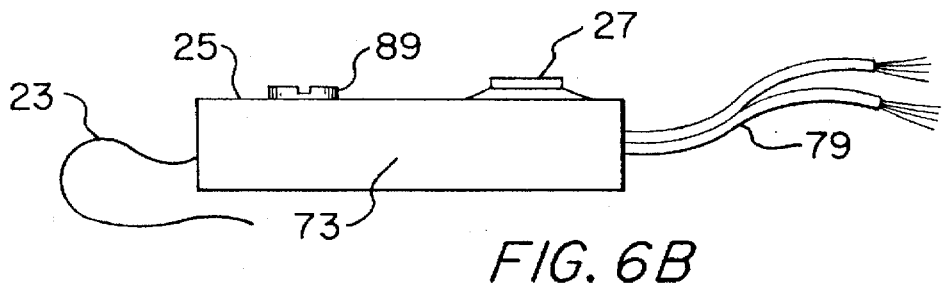
FIG. 6B is a side view of the receiver unit shown in FIG. 6A.

Receiver unit 25 is shown in FIGS. 6A, 6B, 6C and 7. Receiver unit 25 is remotely situated with respect to transmitter units 19 and is preferably positioned in the cab of the vehicle. Indicator 27 can be positioned on housing 73 to provide indications of sensed abnormal tire conditions at the receiver, as indicated in FIGS. 6A and 6B, or alternately, indicator 27 can be positioned remote from the receiver unit, by being positioned, for example on the dash of the vehicle, using leads 75 extending between the indicator and jacks 77 at the receiver unit.

Power is provided to the receiver unit through cables 79, with the power being normally provided from the battery of the vehicle.

Figure 6C:
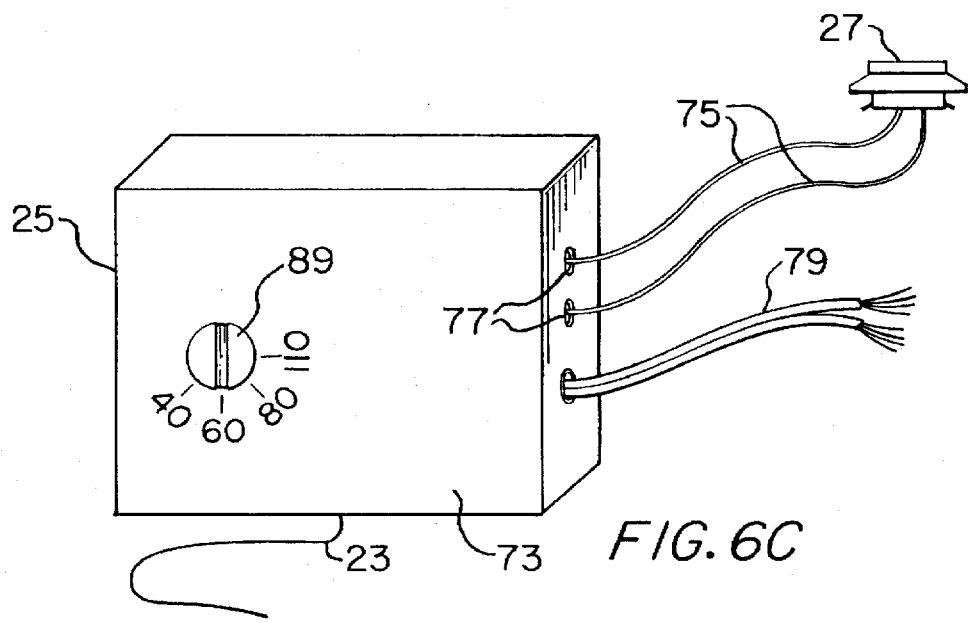
FIG. 6C is a side view of the receiver unit as shown in FIG. 6A but having the indicator remotely mountable with respect to the receiver unit.
Figure 7:
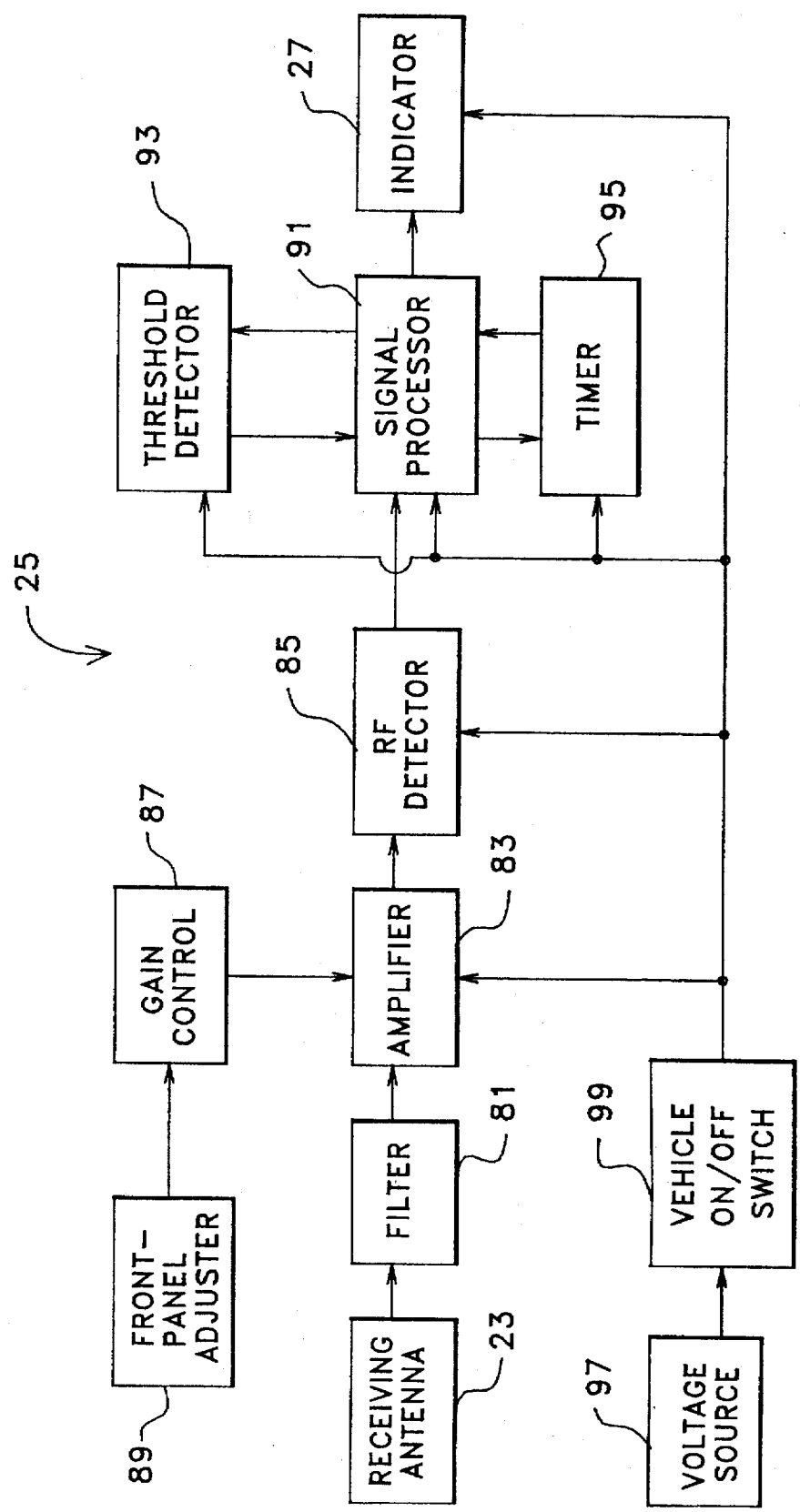
FIG. 7 is a simplified block diagram of the receiver unit.

As indicated in FIGS. 6A, 6B and 6C, receiving antenna 23 is external of housing 73 (the antenna could, however, be mounted within housing 73, if needed or desired) and, as shown in the simplified block diagram typically illustrating the receiver unit in FIG. 7, antenna 23 is connected through filter 81 and amplifier 83 to RF detector 85.

A reception distance controller is provided by variable gain control 87 to desensitize the receiver unit and thus affect the range of the receiver unit so that variable gain control 87 therefore controls the maximum distance of receiver unit response. An externally accessible control, or front panel adjuster, 89 is distance calibrated (as indicated in FIGS. 6A, 6B and 6C) and is set (by rotation of the control) to adjust the gain established by gain control 87.

The output from RF detector 85 is coupled to signal processor 91. Processor 91 is connected with threshold detector 93 and timer 95, and provides an output to indicator 27. RF detector 85 provides an output signal when it detects RF signals falling within the bandwidth of filter 81, and the bandwidth of filter 81 is centered at the output frequency of transmitter units 19. The output signal from RF detector 85 is processed (including being demodulated if the RF signal sent by transmitter units 19 includes a modulated signal) and interrogated by threshold detector 93 and timer 95 to confirm that it represents a valid message, or signal, from a transmitter unit 19.

As also shown in FIG. 7, voltage source 97 (normally the battery of the vehicle as brought out above) is connected to off/on switch 99 (preferably the vehicle off/on switch) so that, when switch 99 is in the on, or closed, position, power is supplied to amplifier 83, RF detector 85, signal processor 91, threshold detector 93, timer 95 and indicator 27.

Timer 95 is connected with signal processor 91 to receive an indication of amplified signal outputs received at receiving antenna 23 and, responsive thereto, timer 95 provides an enabling signal to signal processor 91 to maintain signal processor 91 enabled so long as timer 95 continues to provide an enabling signal. While enabled, signal processor 91 provides an output indication of abnormal tire condition detection, and this indication is continuously displayed at indicator 27.

Upon receipt of a first indication of receipt by receiving unit 25 of a first output signal from a transmitter unit 19, timer 95 commences a timing period that is longer than the time interval between generation of output pulses by transmitter units 19 (a timing period of timer 95 of about 45 seconds has been provided in a working embodiment of this invention using transmitter units having a time interval of about 30 seconds between 5 second duration output pulse signals), with the start of the timing period also causing the enabling signal to be provided by timer 95 to signal processor 91 to commence the display of the indication of abnormal condition detection at indicator 27 (the display is then continuous so long as signal processor 91 receives the enabling signal from timer 95).

If no indication of receipt of an additional output signal from transmitter units 19 is received by timer 95 from signal processor 91 prior to timer 95 reaching the end of any timing period, timer 95 discontinues providing the enabling signal to signal processor 91 and signal processor 91 no longer provides an indication of abnormal condition detection to thus cause indicator 27 to no longer indicate abnormal condition detection.

If, however, an indication of receipt of an additional output signal from transmitter units 19 is received by timer 95 from signal processor 91 prior to timer 95 reaching the end of any timing period, timer 95 automatically resets and restarts the timing period to thus maintain the enable signal to signal processor 91 and thus continue display of the indication of abnormal condition detection at indicator 27. Therefore, so long as the receiver unit is powered and receives a timely output signal from a transmitter unit indicating sensing of a predetermined abnormal condition or conditions with respect to tires being monitored, the indicator will continuously be energized to display to the vehicle operator that a sensed fault condition exists.

Each tire to be monitored has a monitoring device 11 inserted within the casing (with the pressure sensor unit, where utilized, being enabled prior to insertion) at mounting of the tire on the rim, and the receiver unit (normally in the cab of the vehicle) is turned on by turning on the vehicle off/on switch to commence operation of the system. The system will then automatically monitor the tires having a monitoring device therein whenever and so long as the receiver unit is energized.

During monitoring operations, indicator 27 will remain inactive until a monitored condition is sensed to be abnormal, such as sensing of a predetermined low tire pressure or a predetermined high temperature where tire pressure and tire temperature are being monitored, after which the indicator will indicate to the vehicle operator that an abnormal tire condition has been detected. With the vehicle stopped, the operator can then readily determine the tire at fault, either by observation or by sounding or feeling the tires, and determine the step or steps to be taken to correct the fault. After correction, the indicator will again be inactive until another abnormal tire condition is sensed.

As can be appreciated from the foregoing, this invention provides an improved system, device and method that is particularly well suited for monitoring of tire to detect abnormal tire conditions such as low tire pressure and/or high tire temperature.

What is claimed is:

1. A tire monitoring system, comprising:
   a plurality of housing units each positionable within a monitored tire of a vehicle to form an enclosure therein that is unattached and hence is freely movable within said monitored tire;
   a plurality of sensor units each positioned within said housing units for detecting at least one predetermined abnormal condition of each said monitored tire and providing output indications thereof;
   a plurality of transmitter units each positioned within said housing units and connected with a different one of said sensor units to receive said output indications therefrom, each said transmitter unit including an antenna within said housing units providing output signals responsive to said output indications received by said transmitter units from said sensor units; and
   a receiver unit including an antenna for receiving said output signals from said transmitter units, said receiver unit, responsive to receipt of said output signals, providing an indication of said predetermined abnormal condition detection with respect to each said monitored tire.

2. The system of claim 1 wherein said sensor units are at least one of pressure sensors and temperature sensors, and wherein said receiver unit provides an unspecified tire indication of at least one of predetermined abnormal tire pressure and temperature.

3. The system of claim 1 wherein said sensor units and said transmitter units are equal in number to the number of said housing units with a different one of said sensor units and said transmitter units being positioned within different ones of said housing units.

4. The system of claim 1 wherein said housing units have external surfaces with cushioning thereon.

5. The system of claim 1 wherein said receiver unit includes a reception distance controller for controlling the maximum reception distance of receiver unit response.

6. The system of claim 5 wherein said receiver unit includes a housing, and wherein said reception distance controller includes an adjustable control mounted on said housing of said receiver unit to be accessible externally of said housing, with said control being distance calibrated to facilitate establishing said maximum reception distance of receiver unit response.

7. The system of claim 1 wherein each of said transmitter units includes a timer to cause each said transmitter unit to provide periodic output signals to said receiver unit upon sensing of said predetermined abnormal condition by said sensor units, and wherein said receiver unit also includes a timer for establishing a predetermined time period greater than the time interval between said periodic output signals provided by said transmitter units with said predetermined time period commencing each time that one of said periodic output signals is received from said transmitter units whereby said receiver unit continuously provides said indication of predetermined abnormal condition detection so long as said receiver unit continues to receive at least an additional one of said periodic output signals during each said predetermined time period.

8. A tire monitoring device, comprising:
   a sensor unit, said sensor unit including at least one of a pressure sensor and a temperature sensor with said sensor unit detecting at least one of predetermined low tire pressure and predetermined high tire temperature and providing output indications thereof;

a transmitter unit connected with said sensor unit to receive said output indications therefrom and, responsive thereto, providing output signals; and a housing unit enclosing said sensor unit and said transmitter unit therein, said housing unit being configured to be positioned unattached and hence is freely movable within a tire to be monitored.

9. The device of claim 8 wherein said housing unit has external surfaces with cushioning thereon.

10. The device of claim 8 wherein said housing has an opening therein, wherein said sensor unit includes a pressure sensor, wherein said pressure sensor includes a diaphragm exposed to pressure within said tire through said opening in said housing with said diaphragm being movable in response to changes in said pressure, and wherein said pressure sensor also includes a pressure sensitive switch that is responsive to movement of said diaphragm so that said pressure sensitive switch is closed upon said diaphragm moving a predetermined distance indicative of a predetermined low tire pressure with closing of said switch causing said predetermined output indications to be provided from said sensor unit.

11. The device of claim 10 wherein said pressure sensor also includes an operational disabling control engagable with said diaphragm of said pressure sensor for enabling said pressure sensor to be disabled.

* * * * *